United States Patent [19]
Hyatt et al.

[11] Patent Number: 5,063,896
[45] Date of Patent: Nov. 12, 1991

[54] CHAMBER AND ENGINE CLEANING APPARATUS AND METHOD

[75] Inventors: Charles K. Hyatt, Chapin; Irvin H. Cornelison, III, Lexington, both of S.C.

[73] Assignee: Auto Dialysis, Inc., Irmo, S.C.

[21] Appl. No.: 568,870

[22] Filed: Aug. 17, 1990

[51] Int. Cl.$^5$ .............................................. F02B 77/00
[52] U.S. Cl. ............................... 123/198 A; 134/22.1; 134/102; 134/169 A
[58] Field of Search .................. 123/198 A, 25 G; 134/21, 22.1, 22.12, 22.14, 30, 34, 40, 42, 76, 94, 102, 169 A, 22.19

[56] References Cited

U.S. PATENT DOCUMENTS

| | | | |
|---|---|---|---|
| 1,549,952 | 8/1925 | Anderson . | |
| 1,751,053 | 3/1930 | Osborne | 134/22.19 |
| 2,348,465 | 5/1944 | Geiringer | 134/22.19 |
| 2,525,978 | 10/1950 | Vallerie | 134/21 |
| 2,604,895 | 7/1952 | Fechter | 134/58 |
| 2,681,657 | 6/1954 | Griffith, Jr. | 134/98 |
| 2,685,347 | 8/1954 | Busby | 134/40 |
| 2,970,074 | 1/1961 | Shelburne | 134/21 |
| 3,042,553 | 7/1962 | Kearney et al. | 134/30 |
| 3,046,163 | 7/1962 | Kearney et al. | 134/30 |
| 3,431,145 | 3/1969 | Riley | 134/22.19 |
| 3,779,213 | 12/1973 | Knudsen | 134/102 |
| 3,813,299 | 5/1974 | Bugor | 134/24 |
| 4,174,231 | 11/1979 | Hobgood | 134/34 |
| 4,877,043 | 10/1989 | Carmichael et al. | 134/169 A |

Primary Examiner—Noah P. Kamen
Attorney, Agent, or Firm—Finnegan, Henderson, Farabow, Garrett & Dunner

[57] ABSTRACT

The invention comprises an apparatus for cleaning chambers such as those of engines and transmissions, including a reservoir, a quantity of synthetic cleaning fluid disposed in the reservoir, a first channel for fluidly connecting the reservoir with a first oil passageway opening in an internal combustion engine, a second channel for fluidly connecting the reservoir to a second oil passageway opening in the internal combustion engine, and a pump for pumping the synthetic cleaning fluid from the reservoir through the first channel and into the engine and then back to the reservoir through the second channel. The invention also comprises a process for cleaning internal combustion engines including the steps of draining the oil from the engine, attaching a first conduit to a first oil passageway opeining in the engine, attaching a second conduit to a second oil passageway opening in the engine, pumping a first quantity of synthetic cleaning fluid through the first conduit and into the engine using a pump, and pumping synthetic cleaning fluid out of the second opening in the engine through the second conduit.

22 Claims, 2 Drawing Sheets

FIG. 2

| VALVE\CYCLE | AIR | INLET | OUTLET | INJECTION | BLOCK |
|---|---|---|---|---|---|
| FIRST FLUSH | O | C | C | C | O |
| FIRST IDLE | C | C | C | C | C |
| SECOND FLUSH | O | C | C | C | O |
| SECOND IDLE | C | C | C | C | C |
| RECOVERY | O | O | C | C | C |
| OIL INJECTION | O | C | O | O | C |

CHAMBER AND ENGINE CLEANING APPARATUS AND METHOD

BACKGROUND OF THE INVENTION

1. Field of the Invention

The invention relates to an apparatus and method for cleaning chambers of engines, transmissions and other closed housings that may periodically require internal cleaning. The apparatus and method are especially useful in cleaning the oil passageways and connected cavities of internal combustion engines. While the invention will be discussed in connection with the cleaning of engines, it is not intended that the invention is limited to such uses.

2. Description of the Related Art

Through use, oil hardens and thickens on the walls of oil passageways in engines, thereby restricting oil flow. Oil flow restriction occurs when ambient air carrying dirt bypasses the piston rings and mixes with the oil in the engine. Since dirty oil causes wear that shortens the life of an engine, it is desirable to remove accumulated oil and hydrocarbon deposits from time to time.

Currently, this is accomplished by adding cleaning agents to the crank case and circulating them with the engine oil as the engine is run. While these cleaning agents remove some of the dirty oil and hydrocarbon deposits, the cleaning agents become suspended in the oil and increase engine wear until the oil is replaced. In addition, due to the fact that the cleaning agents are diluted by the oil and only incidentally contact portions of the internal cavities in the engine, they are not totally effective.

Attempts have been made to pump a cleaning solution through the engine in order to clean the oil passageways. However, such previous attempts have proven less than optimum. For example, attempts have been made to flush solvents through engines. However, while solvents tend to be more effective when heated, they also burn rapidly when their flashpoint is reached. Therefore, extreme care must be taken with solvents to ensure that their temperatures do not approach their flashpoints. However, a hot engine may be at a temperature sufficient to cause spontaneous combustion of the cleaning solvent even when the solvent is not preheated outside of the engine.

In order to avoid the problems associated with solvent use, water-based cleaning agents have been flushed through the engine. However, water-based cleaning agents may lead to rusting within the engine. In addition, use of a water-based flush voids most engine manufacturer's warranties, and is therefor undesirable.

In addition, because solvents and water-based cleaning agents may damage the engine if they are present in the engine oil, the remnants of the cleaning agent must be removed from the engine before oil can be added. This usually requires that the engine be air dried which may take at least an hour. In contrast, a synthetic based cleaning fluid such as AD2000 TM Flush is friendly to the engine and the engine oil and, therefore, remnants will not adversely affect the engine or its performance. Thus, the engine need not be entirely dried before oil is added, and the entire flushing and oil refilling process of the present invention can be achieved in under ten minutes.

Another drawback of related art processes is that they are labor intensive requiring an operator to continuously monitor and control the operation. In contrast, the present invention provides an improved structure including a controller which automates the cleaning process through an improved system of conduits and controlled valves. This improved structure reduces the amount labor required for cleaning the engine and improves engine cleaning efficiency.

Previous attempts to flush engines used devices that were cumbersome, difficult to control and imprecise with respect to the amount of cleaning fluid circulated through the engine. Such lack of control leads to quality control problems. The present invention, with its controller, achieves excellent quality control.

A further problem with related art devices lies in their inability to prelubricate the engine after flushing. If prelubrication is not provided for some engines, such as diesels, "dry starts" may occur that can damage the engine. The present invention serves to prelubricate the engine to prevent "dry starts."

SUMMARY OF THE INVENTION

The objectives of the present invention are to provide an apparatus and method for cleaning chambers such as those of engines and transmissions while avoiding the problems associated with the use of solvents and water-based cleaning fluids. Use of a synthetic-based cleaning fluid such as AD2000 TM Flush which includes automotive detergents, antioxidants, rust inhibitors and dispersants for breaking down hardened oil not only overcomes the problems associated with the use of solvents and water-based cleaning agents, but also has additional advantages. For example, AD2000 TM Flush has superior metal wetting properties and forms a multimolecular protective film on the metal surfaces that it contacts. These qualities may increase the performance of automotive engines by as much as 150-200 rpm.

Another objective of the present invention is to precisely control the flow of cleaning fluid through the engine. This objective is achieved by providing a unique interconnection of conduits and valves that are controlled by a controller. This improved structure permits automated cleaning of engines to reduce required labor and improve cleaning efficiency thereby providing excellent quality control.

An even further objective of the present invention is to prevent engine "dry starts." This objective is achieved through lubricant injection at the end of the cleaning process.

Additional objectives and advantages of the invention will be set forth in part in the description which follows and in part will be obvious from the description or may be learned by practice of the invention. The objectives and advantages of the invention will be realized and attained by means of the elements and combinations particularly pointed out in the appended claims and their equivalents.

To achieve the objectives and in accordance with the purposes of the invention, as embodied and broadly described herein, the invention includes an apparatus for cleaning chambers such as those of engines and transmissions, comprising a reservoir, a quantity of synthetic cleaning fluid disposed in the reservoir, first channel means for fluidly connecting the reservoir with a first opening in the chamber, second channel means for fluidly connecting the reservoir to a second opening in the chamber, and pump means for pumping the synthetic cleaning solution from the reservoir through the first channel means and into the chamber and then back to the reservoir through the second channel means.

In accordance with the present invention, there also is provided a process for cleaning internal combustion engines comprising the steps of draining the oil from the engine, attaching a first conduit to a first oil passageway opening in the engine, attaching a second conduit to a second oil passageway opening in the engine, pumping a quantity of synthetic cleaning fluid through the first conduit and into the engine, and pumping the synthetic cleaning fluid out of the second opening in the engine through the second conduit.

It is to be understood that both the foregoing general description and the following detailed description are exemplary and explanatory only and are not restrictive of the invention as claimed.

The accompanying drawings which are incorporated in and constitutes a part of the specification, illustrate one embodiment of the invention and together with the description, serve to explain the principles of the invention.

BRIEF DESCRIPTION OF THE DRAWINGS

FIG. 2 is a chart depicting the opened and closed states of each of the values of FIG. 1 during each cleaning cycle.

DESCRIPTION OF THE PREFERRED EMBODIMENTS OF THE INVENTION

Figure 1:
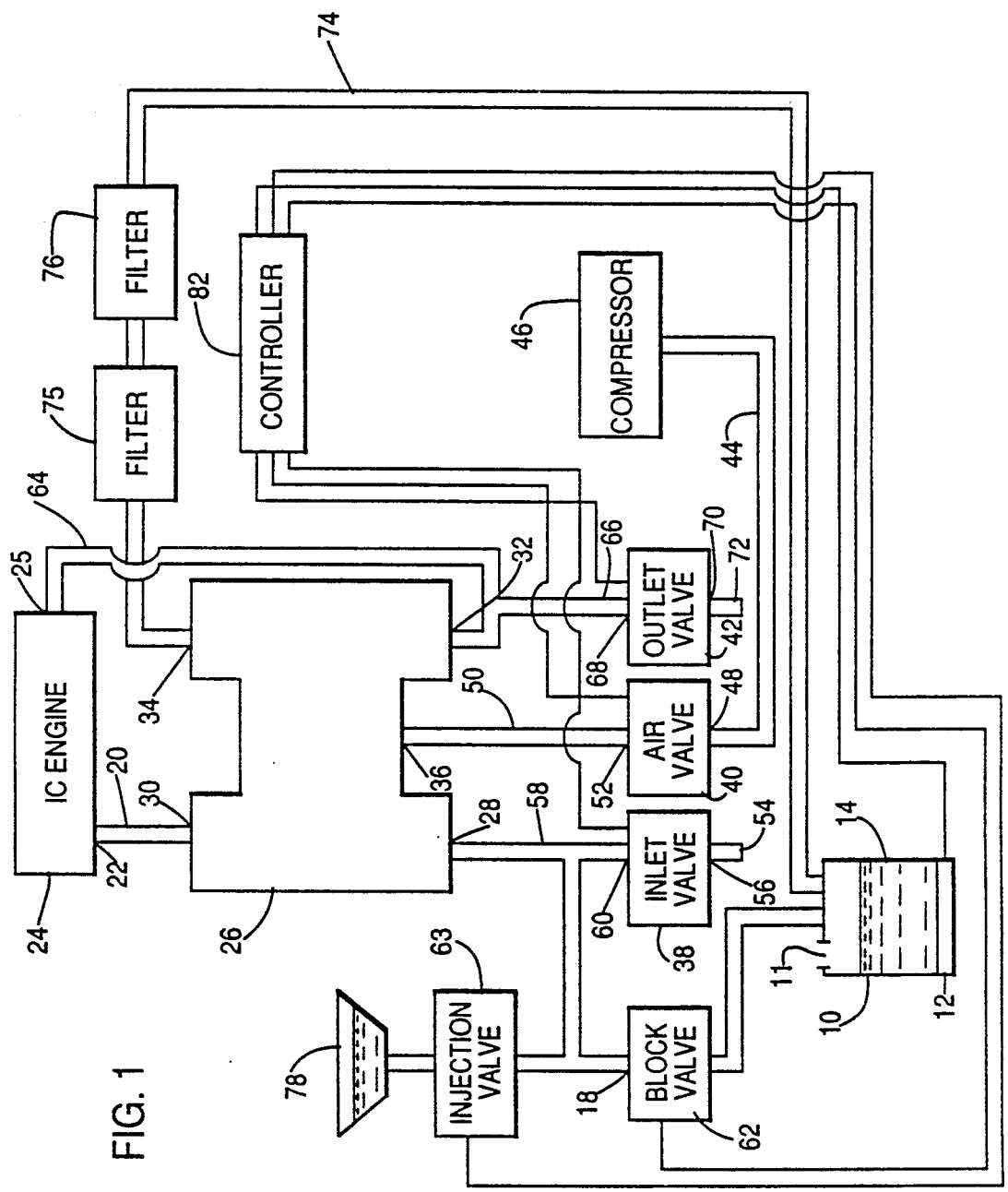
FIG. 1 is a schematic diagram showing the apparatus of the present invention.

Reference will now be made to the present preferred embodiments of the invention, an example of which is illustrated in the accompanying drawings.

In accordance with the present invention, there is provided an apparatus for cleaning chambers such as those of engines and transmissions. As illustrated in FIG. 1, the apparatus is useful for cleaning an automobile engine 24 by utilizing existing engine ports, such as an oil filter opening 22, and a standard oil drain plug opening 25. A first channel of conduits connects oil filter port 22 with a cleaning fluid tank 10. A pump 26 is disposed in the first channel to pump cleaning fluid 14 from the tank 10 into the engine 24. A second channel of conduits connects the drain plug opening 25 with the tank 10 to return the cleaning fluid to the tank 10.

In accordance with the present invention there is provided a reservoir for storing a quantity of synthetic cleaning fluid therein. As embodied herein, the reservoir includes a tank 10 having a vent 11 and a heating element 12 disposed thereunder. The heating element 12 should be capable of heating the contents of tank 10 to between at least 80° C. and 110° C.

A quantity of synthetic cleaning fluid 14 is disposed in tank 10. Preferably, the synthetic cleaning fluid is AD2000 TM Flush manufactured by GRC Corporation and distributed exclusively through Auto Dialysis, Inc., 1017 Kinley Road, Irmo, South Carolina 29063. The AD2000 TM Flush which has a synthetic base and includes detergents, dispersants, antioxidants and rust inhibitors serves the following functions: 1) it dissolves and disperses carbons; 2) it neutralizes corrosive acids; 3) it disperses glycol and water; 4) it provides rust and corrosion protection; 5) it provides lubricity; 6) it serves as a friction modifier; 7) it provides extreme pressure protection; 8) it has unique and beneficial metal wetting properties; and 9) it provides a multi-molecular protective film on metal surfaces.

Also in accordance with the present invention, there is provided pump means having a first inlet port, a first outlet port, a second inlet port and a second outlet port. The pump may be electric or may be an air driven double diaphragm pump 26, such as a Warren Rupp EB ½-A Sandpiper. Due to the heavy use that pump 26 must endure, it is beneficial for the pump 26 to be outfitted with Teflon TM diaphragms which last longer than conventional rubber diaphragms. The pump 26 includes a first inlet port 28, a first outlet port 30, a second inlet port 32 and a second outlet port 34. In addition, if an air driven pump is used, the pump 26 includes a pressure port 36 for receiving pressurized air for driving the pump.

In accordance with the invention, there is also provided an inlet valve, an air valve, and an outlet valve. As embodied herein, the inlet valve, air valve, and outlet valve are electric solenoid valves 38, 40, and 42, respectively. Each of valves 38, 40 and 42 are movable between an open position permitting fluid flow therethrough, and a closed position, prohibiting fluid flow therethrough.

Air valve 40 is connected between compressor 46 and the pressure port 36 of the pump 26 and serves as an on/off switch for the pump. In accordance with the present invention, a first conduit means connects an inlet of the air valve with a source of air pressure. As embodied herein, the first conduit means includes a conduit 44 for connecting the compressor 46 with the inlet 48 of the air valve 40.

A regulator (not shown) may be provided in-line between the compressor 46 and the pump 26 to control air pressure to the pump. The regulator may also be connected to controller 82.

The present invention further includes second conduit means for connecting an outlet of the air valve with the pressure port of the pump means to supply pressurized air for driving the pump means. As embodied herein, a second conduit means includes a conduit 50 for connecting the outlet port 52 of the air valve 40 with pressure port 36 of pump 26. When the air valve 40 is in an open position, and compressor 46 is running, air pressure is supplied to the pump 26 through the pressure port 36 in order to drive the pump 26.

The present invention also includes third conduit means for connecting an inlet port of the inlet valve with ambient air. As embodied herein, the third conduit means includes an inlet port 56 of the inlet valve 38. Third conduit means may also include a conduit 54 connected to the inlet port 56 of the inlet valve 38.

In accordance with the present invention there is also provided fourth conduit means for connecting an outlet port of the inlet valve with the first inlet port of the pump means. As embodied herein, fourth conduit means includes a conduit 58 connecting the outlet port 60 of the inlet valve 38 with the first inlet port 28 of the pump 26.

In accordance with the present invention there is provided fifth conduit means for flow communicating said fourth conduit means with said reservoir means. As embodied herein, fifth conduit means includes a conduit 18 connecting the tank 10 with the conduit 58. As will be described later, in a preferred embodiment of the invention, a block valve 62 may be disposed in the conduit 18. When the pump 26 is operating, the inlet valve 38 is in the closed position, and the block valve 62 is in an opened position to flow communicate conduits 18 and 58, cleaning fluid 14 is pumped from the tank 10 into the engine 24 through the oil filter opening 22. When the inlet valve 38 is in an open position, ambient air is drawn through conduit 54 by pump 26, thereby preventing cleaning fluid from being drawn out of tank 10. Conduit 54 and inlet valve 38, therefore, serve as a bleed valve for preventing negative pressure in conduit 18.

In accordance with the invention, there is provided sixth conduit means for flow communicating the first outlet port of the pump means with a first chamber opening and seventh conduit means for flow communicating a second chamber opening with the second inlet of the pump means. As embodied herein, sixth conduit means includes a conduit 20 extending between and connecting the oil filter opening 22 of the engine 24 with the first outlet port 30 of the pump 26. In addition, as embodied herein, seventh conduit means includes a conduit 64 extending between and connecting the drain plug opening 25 of the engine 24 and the second inlet opening 32 of the pump 26.

In accordance with the present invention, there is also provided eighth conduit means for flow communicating said seventh conduit means with an outlet of said outlet valve, and ninth conduit means for flow communicating an inlet opening of said outlet valve with ambient air. As embodied herein, eighth conduit means includes a conduit 66 extending between and connecting the conduit 64 and outlet port 68 of the outlet valve 42. Also as embodied herein, ninth conduit means includes an inlet port 70 of the outlet valve 42. Ninth conduit means may also include a conduit 72 exposing the inlet port 70 to ambient air.

When the outlet valve 42 is in a closed position, the pump 26 draws the cleaning fluid 14 from the engine 24 through the conduit 64 and into the second inlet port 32. When the outlet valve 42 is in an open position, ambient air is drawn through conduit 72 thereby preventing fluid from being drawn out of the engine 24 through the conduit 64.

In accordance with the present invention, there is also provided tenth conduit means for flow communicating the second outlet of the pump means with the reservoir means. As embodied herein, tenth conduit means includes a conduit 74 connecting the second outlet port 34 of the pump 26 with the reservoir tank 10. In a preferred embodiment, filters 75, 76 may be disposed in the conduit 74 to remove dirt, oil, carbon and other undesirable elements from the cleaning fluid before it is returned to the tank 10. Filter 75 may be a 20 micron filter, and filter 76 may be a three micron filter. Of course, a single filter or a plurality of filters may be used in place of filters 75 and 76, depending on specific filtering requirements.

Also in accordance with the invention, there is provided control means for regulating the positions of said air valve, said inlet valve, and said outlet valve, in accordance with a predetermined program. As embodied herein, control means includes a controller 82 electrically connected to the inlet valve 38, air valve 40 and outlet valve 42. The controller 82 may also be connected to the reservoir heating element 12 and block valve 62 to coordinate the functions of the heating element 12 and block valve 62 with the inlet valve 38, air valve 40 and outlet valve 42. Controller 82 opens and closes each connected valve in accordance with a predetermined program, the steps of which will be described in detail in connection with the process of the invention.

The invention may also include means for injecting lubricant into the engine. As embodied herein, lubricant injection means includes a funnel 78 connected to the conduit 18 through an injection valve 63. The injection valve 63 is selectively movable between an open position, permitting flow from the funnel 78 to the engine 24 through the conduits 58 and 18, and a closed position preventing flow from the funnel 78 to the engine 24. When the injection valve 63 and inlet valve 38 are closed and the block valve 62 is opened, the pump 26 pumps cleaning fluid 14 from tank 10 into engine 24. When the injection valve 63 is opened and the inlet valve 38 and block valve 62 are closed, the pump 26 injects oil from the funnel 78 into the engine 24.

In an alternative embodiment (not shown), the injection valve 63, the block valve 62, and the funnel 78 may not be provided within the circuit shown in FIG. 1, and lubricant injection means may include a separate pump, conduit and lubricant source for direct injection of the lubricant into the engine. According to this alternative embodiment, an adapter having two inlet ports is connected to the oil filter opening 22 of the engine 24. An oil conduit and conduit 20 are each connected to a separate inlet port of the adaptor. Thus, when the controller 82 activates the lubricating oil pump, oil may enter the engine even though conduit 20 remains connected to the oil filter opening 22.

The process of the present invention will now be described with reference to FIGS. 1 and 2. Throughout the description of the process, the injection valve 63 remains closed and the block valve 62 remains opened unless otherwise stated.

Initially, the oil plug is removed from the opening 25 and the oil filter is removed from the opening 22 of an engine 24. After the oil is drained by gravity through the opening 25, the conduit 20 is connected to the oil filter opening 22 and conduit 64 is connected to the drain plug opening 25. The synthetic cleaning fluid 14 stored in the tank 10 is heated by heating element 12 until it reaches a temperature of between 80° C. and 110° C., preferably, 100° C. Subsequently, during a first flush cycle, the controller 82 closes the inlet valve 38, opens the air valve 40, closes the outlet valve 42, and maintains block valve 62 in an open position to provide flow communication from the tank 10 to the engine 24. During the first flush cycle, air from the compressor 46 travels through the conduit 44, air valve 40, conduit 50, and into air port 36 of the pump 26 to drive the pump 26 in order to pump the synthetic fluid 14 from the tank 10 through the oil filter opening 22 into the engine 24. The pump 26 also simultaneously pumps the cleaning fluid out of the engine through the drain plug opening 25 and back into the tank 10 through the filters 75, 76. This first flush cycle extends for a period of between 30 seconds and 6 minutes, preferably about 3 minutes. During the first flush cycle and throughout the process, the pump 26 is regulated by the air valve 40 which maintains an approximate line pressure of 35 psi in order to pump the cleaning fluid through the engine 24 at a rate of approximately 1½ gallons per minute.

When the first flush cycle is complete, the controller 82 implements a first idle cycle. During the first idle cycle, the controller 82 closes the air valve 40 so that cleaning fluid is neither pumped into nor out of the engine 24. This allows the cleaning fluid within the engine 24 to soak. This soaking is especially beneficial for cleaning the sump screen of the engine which may not be entirely cleaned from the first flush cycle alone.

In the first idle cycle, cleaning fluid accumulates on the sump screen to emulsify hard carbon embedded therein, and a portion of the cleaning fluid drains by gravity from the engine. Preferably, the idle cycle lasts for approximately one minute.

As a precautionary measure, the controller 82 may be programmed to run a second flush cycle for approximately 3 minutes after the first idle cycle. Similar to the first flush cycle, the controller 82 maintains the inlet valve 38 and outlet valve 42 in closed positions, and maintains the air valve 40 in an open position. If the controller 82 is programmed to run a second flushing cycle, a second idle cycle similar to the first idle cycle should also be programmed to run for a period of at least approximately 30 seconds.

After the second idle cycle, the controller 82 initiates a recovery cycle wherein the controller 82 opens the inlet valve 38 and the air valve 40, and maintains the outlet valve 42, in a closed position. With the inlet valve 38 in an open position, the pump 26 is incapable of pumping synthetic cleaning fluid 14 into the engine 24. Rather, it pumps ambient air from the conduit 54 into the engine 24 through the oil filter opening 22. With the outlet valve 42 closed, the pump 26 draws air and any remnants of cleaning fluid remaining in the engine 24 out of the drain plug opening 25 through the conduit 74. Thus, the recovery cycle removes any vestiges of cleaning fluid remaining in the engine and serves to blow-dry the oil passageways of the engine. Preferably, the recovery cycle continues for a period of approximately two minutes. At the end of the recovery cycle, the cleaning process is complete and the conduits 20 and 64 may be detached from the engine.

If desired, the controller 82 may be programmed to perform a lubricant injection cycle. During the lubricant injection cycle, the controller 82 opens the injection valve 63 to flow communicate the funnel 78 with the engine 24, while simultaneously closing the block valve 62 to prevent cleaning fluid 14 from being drawn into engine 24. The lubricant used may vary from engine to engine depending upon engine requirements. During the lubricant injection cycle, the inlet valve 38 is closed, and the air valve 40, and outlet valve 42 are opened. This allows the pump 26 to inject lubricant from the funnel 78 into the engine to prelubricate the engine and prevent a dry start.

For automotive engines, oil or other lubricants may be injected into the engine. AD2000 ™ Engine Treatment distributed by Auto Dialysis Inc. of Lexington, South Carolina, serves as an excellent lubricant.

The controller 82 may be programmed to continue the injection cycle even after all of the lubricant has been pumped from the funnel 78. This serves to pull most lubricant remnants from the pump so that little or no lubricant remains in the pump to contaminate the cleaning solution in subsequent flushes.

In an alternative embodiment (not shown), funnel 78 may be replaced with a lubricant tank, and a flowmeter may be connected to controller 82 to regulate the amount of lubricant injected into engine 24.

The controller 82 may also include a counting circuit for counting the number of flushes performed with each tank of synthetic cleaning fluid. When the counter reaches a predetermined number, the controller 82 can provide a signal or prevent additional engine flushes to be performed until after the synthetic fluid 14 in tank 10 is replaced and the counter is reset. A sensor (not shown) may be provided in the tank 10 and connected to the controller 82 for sending a signal to the controller 82 when the tank 10 is emptied to thereby reset the counter. With between 15 and 18 gallons of cleaning fluid 14 in the tank 10, the cleaning fluid can be reused for about 40 automotive engine cleanings.

In order to empty the tank 10 of dirty cleaning fluid, the conduit 20 is connected to a drain or a catch basin, the inlet valve 38 is closed, and the air valve 40, block valve 62, and outlet valve 42 are opened. During the emptying cycle, the pump 26 pumps the dirty cleaning fluid out of the tank 10. During a refill operation, the conduit 64 is connected to a fresh supply of cleaning fluid, the outlet valve 42 is closed, and the air valve 40, and inlet valve 38 are opened. With the valves set in this manner, the pump 26 pumps fresh cleaning solution into the tank 10.

The invention may also include a pressure switch (not shown) disposed in the conduit 50 for sending a signal to the controller 82 if pressure in the conduit 50 reaches a predetermined set point. Preferably, the set point is 60 psi. When the set point is reached, the controller 82 shuts down the system and signals an operator that an error has occurred. Similarly, the controller 82 may be programmed to shut down the system if the temperature of synthetic cleaning fluid in the tank 10 exceeds a preset temperature, such as 110° C.

Other embodiments of the invention will be apparent to those skilled in the art in consideration of the specification and practice of the invention disclosed herein. It is intended that the specification and examples be considered as exemplary only, with a true scope and spirit of the invention being indicated by the following claims.

What is claimed is:

1. An apparatus for cleaning chambers such as those of engines and transmissions, the apparatus comprising:
   a reservoir
   a quantity of synthetic cleaning fluid disposed in said reservoir;
   first channel means for fluidly connecting said reservoir with a first opening in the chamber;
   second channel means for fluidly connecting said reservoir to a second opening in the chamber;
   pump means for pumping said synthetic cleaning fluid from said reservoir through said first channel means, into and through the chamber and then back to said reservoir through said second channel means; and
   means for injecting lubricant into the chamber.

2. An apparatus according to claim 1, wherein said synthetic cleaning fluid is AD2000 ™ Flush.

3. An apparatus according to claim 1, further comprising filter means disposed in said second channel means to filter the synthetic cleaning fluid.

4. An apparatus according to claim 1, wherein said lubricant injecting means includes funnel means for holding a quantity of lubricant and an injection valve disposed to selectively fluid communicate said funnel means with said chamber, and means for selectively allowing either said cleaning fluid or said lubricant to flow into said internal combustion engine.

5. An apparatus for cleaning chambers such as those of engines and transmissions, the apparatus comprising:
   reservoir means for storing a quantity of cleaning fluid therein;
   pump means for transporting cleaning fluid from said reservoir means to an inlet of the chamber and for transporting cleaning fluid from an outlet of the chamber to said reservoir means, said pump means including a first inlet port, a first outlet port, a second inlet port, a second outlet port, and a pressure port;

an air valve;

an inlet valve;

an outlet valve;

first conduit means for connecting an inlet of said air valve with a source of air pressure;

second conduit means for connecting an outlet of said air valve with said pressure port of said pump means to supply pressurized air for driving said pump means;

third conduit means for flow communicating an inlet port of said inlet valve with ambient air;

fourth conduit means for flow communicating an outlet port of said inlet valve with said first inlet port of the pump means;

fifth conduit means for flow communicating said fourth conduit means with said reservoir means;

sixth conduit means for flow communicating said first outlet port of said pump means with a first opening the chamber;

seventh conduit means for flow communicating a second opening of the chamber with said second inlet of said pump means;

eighth conduit means for flow communicating said seventh conduit means with an outlet of said outlet valve;

ninth conduit means for flow communicating an inlet opening of said outlet valve with ambient air;

tenth conduit means for flow communicating said second outlet of said pump means with said reservoir means; and control means for regulating the positions of said air valve, said inlet valve, and said outlet valve in accordance with a predetermined program.

6. An apparatus according to claim 5, further comprising filter means disposed in said tenth conduit means.

7. An apparatus according to claim 5, further comprising a quantity of synthetic cleaning fluid disposed in said reservoir means.

8. An apparatus according to claim 7, wherein said synthetic cleaning fluid is AD2000 TM Flush.

9. An apparatus according to claim 5, further comprising a heating element for heating the cleaning fluid disposed in the reservoir.

10. An apparatus according to claim 5, wherein said pump means includes a double diaphragm pump.

11. An apparatus according to claim 5, further comprising means for injecting lubricant into the engine.

12. An apparatus according to claim 11, wherein said lubricant injecting means includes funnel means for holding a quantity of lubricant, block valve means for preventing fluid flow from said reservoir means to the engine, and injection valve means for selectively fluid communicating said funnel means with an oil passageway of the engine.

13. A process for cleaning engines comprising the steps of:

draining the oil from the engine;

attaching a first conduit to a first oil passageway opening in the engine;

attaching a second conduit to a second oil passageway opening in the engine;

pumping a first quantity of synthetic cleaning fluid comprising detergent through said first conduit and into the engine; and pumping said synthetic cleaning fluid out of the engine through said second opening and said second conduit.

14. A process according to claim 13, wherein said synthetic cleaning fluid is AD2000 TM Flush.

15. A process according to claim 13, wherein said first oil passageway opening is an oil filter opening and said second oil passageway opening is a drain plug opening.

16. A process according to claim 13, wherein the step of pumping said first quantity of synthetic cleaning fluid into the engine includes pumping approximately 4.5 gallons of synthetic cleaning fluid into the engine over a period of approximately 3 minutes.

17. A process according to claim 13, further comprising the step of idling the pump for a period of time to allow cleaning liquid in the engine to soak in the engine.

18. A process according to claim 17, further comprising the step of pumping a second quantity of cleaning liquid through said engine after the step of idling.

19. A process according to claim 18, further comprising the steps of evacuating said second quantity of liquid from the engine through said second conduit and drawing air through the engine to dry the inside of the engine after said second quantity of liquid is evacuated from the engine.

20. A process according to claim 13, further comprising the step of heating the cleaning fluid to between about 80° C. and 110° C. prior to the step of pumping said cleaning fluid into the engine.

21. A process according to claim 13, further comprising the step of injecting a quantity of lubricant into the engine after the step of pumping the cleaning fluid out of the engine.

22. A process for cleaning an engine, comprising the steps of:

draining oil from the engine;

attaching a first conduit to a first oil passageway opening in the engine;

attaching a second conduit to a second oil passageway opening in the engine;

conducting a first quantity of synthetic cleaning fluid comprising detergent through said first conduit and into the engine while the engine is in a non-operating state; and conducting said synthetic cleaning fluid out of the engine through said second opening and said conduit.

* * * * *